United States Patent
Yang

(10) Patent No.: US 12,171,017 B2
(45) Date of Patent: Dec. 17, 2024

(54) METHOD FOR SENDING SIDELINK DATA, METHOD FOR RECEIVING SIDELINK DATA, TERMINAL, AND MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 395 days.

(21) Appl. No.: 17/626,751

(22) PCT Filed: Jul. 12, 2019

(86) PCT No.: PCT/CN2019/095811
§ 371 (c)(1),
(2) Date: Jan. 12, 2022

(87) PCT Pub. No.: WO2021/007713
PCT Pub. Date: Jan. 21, 2021

(65) Prior Publication Data
US 2022/0322364 A1   Oct. 6, 2022

(51) Int. Cl.
| H04W 72/56 | (2023.01) |
| H04W 72/02 | (2009.01) |
| H04W 72/0446 | (2023.01) |
| H04W 72/0453 | (2023.01) |
| H04W 80/02 | (2009.01) |
| H04W 92/18 | (2009.01) |

(52) U.S. Cl.
CPC .......... *H04W 72/56* (2023.01); *H04W 72/02* (2013.01); *H04W 72/0446* (2013.01); *H04W 72/0453* (2013.01); *H04W 80/02* (2013.01); *H04W 92/18* (2013.01)

(58) Field of Classification Search
CPC . H04W 72/56; H04W 72/02; H04W 72/0446; H04W 72/0453; H04W 80/02; H04W 92/18
See application file for complete search history.

(56) References Cited

U.S. PATENT DOCUMENTS

| 8,054,834 B2 | 11/2011 | Popa et al. |
| 10,212,102 B2 | 2/2019 | Lee et al. |
| 10,212,103 B2 | 2/2019 | Rubinstein et al. |
| 2010/0034203 A1 | 2/2010 | Popa et al. |

(Continued)

FOREIGN PATENT DOCUMENTS

| CN | 101616155 A | 12/2009 |
| CN | 108270534 A | 7/2018 |
| CN | 109792721 A | 5/2019 |

OTHER PUBLICATIONS

CATT, "MAC PDU format in PC5", 3GPP TSG-RAN WG2 Meeting #103bis, R2-1813733, Chengdu, China, Oct. 8-12, 2018, (3p).

(Continued)

*Primary Examiner* — Blake J Rubin
(74) *Attorney, Agent, or Firm* — Arch & Lake LLP

(57) ABSTRACT

A method is provided for sending sidelink data. The method includes: multiplexing, by a first UE, sidelink data respectively corresponding to at least two sidelink identifiers of a second UE to the same MAC PDU, and sending the MAC PDU to the second UE, each sidelink identifier respectively corresponding to one or more logic channels of the second UE.

20 Claims, 7 Drawing Sheets

(56) References Cited

U.S. PATENT DOCUMENTS

| | | | |
|---|---|---|---|
| 2016/0128093 A1* | 5/2016 | Lee | H04W 72/23 |
| | | | 370/329 |
| 2017/0272384 A1 | 9/2017 | Lee et al. | |
| 2019/0037442 A1 | 1/2019 | Yi et al. | |
| 2019/0182840 A1 | 6/2019 | Feng et al. | |
| 2019/0350045 A1* | 11/2019 | Lee | H04W 80/02 |
| 2020/0146082 A1* | 5/2020 | Chen | H04W 72/21 |
| 2020/0229198 A1* | 7/2020 | Kung | H04W 72/54 |
| 2020/0275474 A1* | 8/2020 | Chen | H04L 1/1848 |
| 2021/0153062 A1* | 5/2021 | Zhang | H04W 40/246 |
| 2022/0070805 A1* | 3/2022 | Ohara | H04W 4/46 |

OTHER PUBLICATIONS

International Search Report of PCT Application No. PCT/CN2019/095811 dated Apr. 3, 2020 with English translation, (4p).

* cited by examiner

METHOD FOR SENDING SIDELINK DATA, METHOD FOR RECEIVING SIDELINK DATA, TERMINAL, AND MEDIUM

CROSS-REFERENCE TO RELATED APPLICATION

The present application is a U.S. National Phase Application of International Patent Application Serial No. PCT/CN2019/095811 filed on Jul. 12, 2019. The entire contents of the above-cited application are hereby incorporated by reference in their entirety for all purposes.

BACKGROUND

With the development of mobile communication technology, the 5th generation mobile networks (5G) era of the Internet of Everything is coming. The most significant benefit brought by the Vehicle to Everything (V2X) technology is to improve the road safety. In order to realize the sidelink between User Equipments (UEs) in the V2X, a sidelink method is introduced.

The transmission of sidelink is addressed through a source identifier and a target identifier carried in a SideLink Share Channel (SL-SCH) sub-header, and there is no need to establish a connection before transmission. The source identifier corresponds to a sidelink identifier of a first UE, and the first UE may correspond to one or more sidelink identifiers. The target identifier corresponds to a sidelink identifier of a second UE, and the second UE may correspond to one or more sidelink identifiers. The first UE first determines a time-frequency resource used for sending first sidelink data to the second UE. The source UE will select the second UE with the highest priority logical channel, compose the to-be-sent data of the target UE into a Medium Access Control Protocol Data Unit (MAC PDU), and send the MAC PDU to a physical layer. After receiving the MAC PDU, the second UE sends the MAC PDU to a logical channel corresponding to the target identifier.

SUMMARY

Examples of the present disclosure provide a method for sending sidelink data, a method for receiving sidelink data, a terminal, and a medium.

According to a first aspect of the present disclosure, a method for sending sidelink data is provided, which is applied to a first UE in a V2X. The method includes:

multiplexing, by the first UE, sidelink data respectively corresponding to at least two sidelink identifiers of a second UE to the same MAC PDU, and sending the MAC PDU to the second UE, each sidelink identifier respectively corresponding to one or more logic channels of the second UE.

According to a second aspect of the present disclosure, a method for receiving sidelink data is provided, which is applied to a second UE in a V2X. The method includes:

receiving an MAC PDU sent by a first UE, the MAC PDU including sidelink data respectively corresponding to at least two sidelink identifiers of the second UE, and each sidelink identifier respectively corresponding to one or more logic channels of the second UE; and sending the sidelink data in the MAC PDU to the corresponding logic channel according to the at least two sidelink identifiers.

According to a third aspect of the present disclosure, a terminal is provided. The terminal includes: a processor; a transceiver connected with the processor; and a memory configured to store an executable instruction executed by the processor. The processor is configured to load and execute the executable instruction to implement the method for sending the sidelink data as described in the above aspect, and/or, the method for receiving the sidelink data as described in the above aspect.

According to a fourth aspect of the present disclosure, a non-transitory computer-readable storage medium is provided. The readable storage medium stores an executable instruction thereon. The executable instruction is loaded and executed by a processor to implement the method for sending the sidelink data as described in the above aspect, and/or, the method for receiving the sidelink data as described in the above aspect.

BRIEF DESCRIPTION OF THE DRAWINGS

In order to explain the technical solutions of the examples of the present disclosure more clearly, the accompanying drawings used in the description of the examples will be briefly introduced below. Apparently, the drawings in the following description are only some examples of the present disclosure. Those of ordinary skill in the art can obtain other drawings based on these drawings without creative work.

DETAILED DESCRIPTION

In order to make the objectives, technical solutions, and advantages of the present disclosure clearer, the following further describes the examples of the present disclosure in detail with reference to the accompanying drawings.

During the communication process according to the prior art, in the case that a bearable data volume of the time-frequency resource is greater than a data volume of the MAC PDU, the remaining resource space will be filled, so the remaining resource space cannot be further utilized, resulting in waste of resources.

Figure 1:
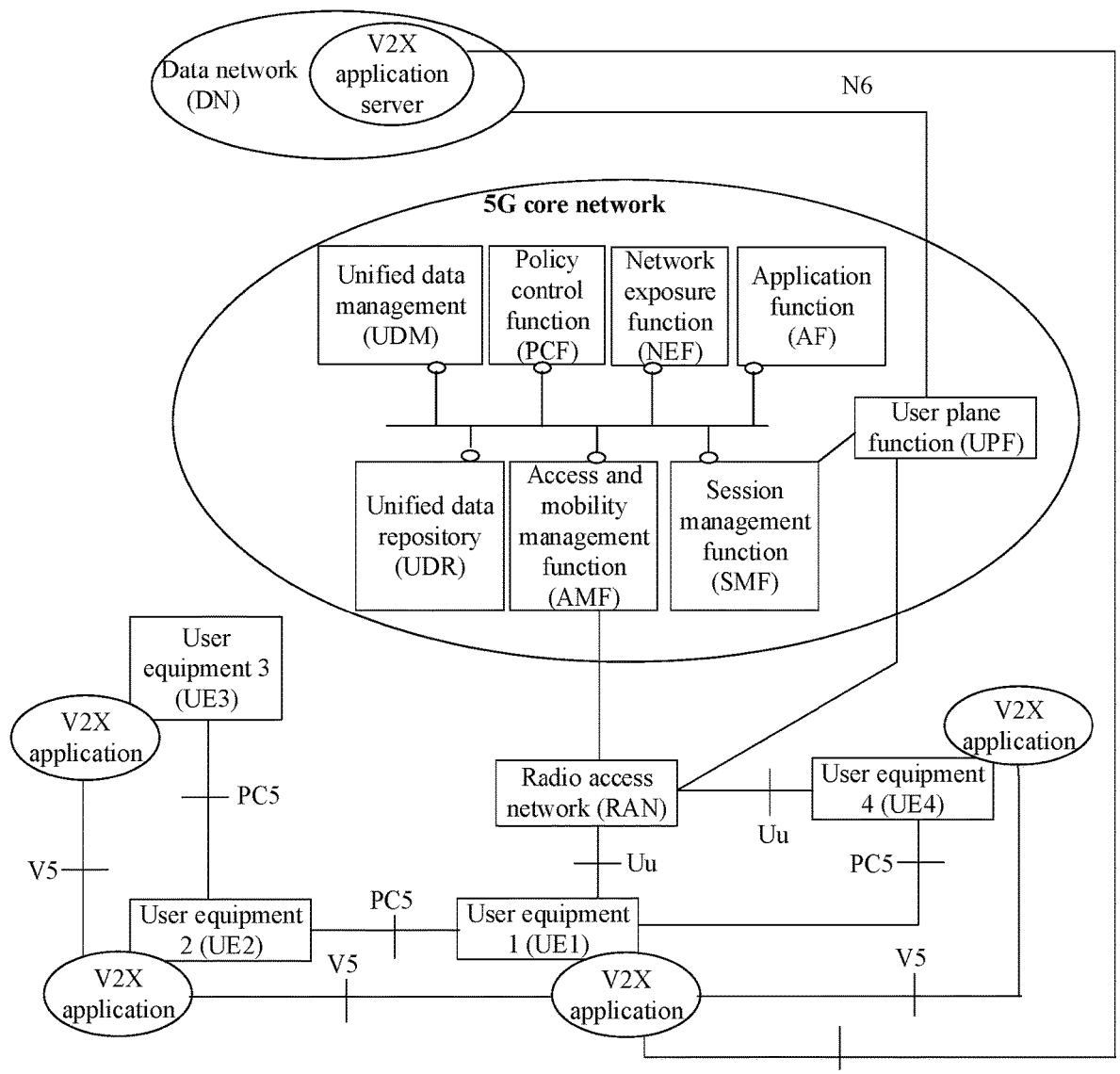
FIG. 1 is a block diagram of a communication system provided by one example of the present disclosure.

FIG. 1 illustrates a block diagram of a communication system that supports sidelink provided by one example of the present disclosure. The communication system may be a non-roaming 5G system architecture, which may be applied to a Vehicle to Everything (V2X) service using a D2D technology.

The system architecture includes a data network (DN), and the data network is internally provided with a V2X application server required by the V2X service. The system architecture further includes a 5G core network. Network functions of the 5G core network include: Unified Data Management (UDM), Policy Control Function (PCF), Network Exposure Function (NEF), Application Function (AF), Unified Data Repository (UDR), Access and Mobility Management Function (AMF), Session Management Function (SMF), and User Plane Function (UPF).

The system architecture further includes: a New Generation-Radio Access Network (NG-RAN) and four user equipments (namely UE1 to UE4) shown exemplarily. Each UE is provided with a V2X application. One or more access network devices, such as a base station (gNB), are provided in the NG-RAN.

In this system architecture, the data network and the UPF in the 5G core network are connected through an N6 reference point; a V2X application server is connected with the V2X application in the UE through a V1 reference point; the NG-RAN is connected with the AMF and the UPF in the 5G core network; the NG-RAN is connected to UE1 and UE5 through a Uu reference point, respectively; and a plurality of UEs perform sidelink through a PC5 reference point. A plurality of V2X applications are connected through a V5 reference point. The above-mentioned reference points may also be referred to as an "interface".

Figure 2:
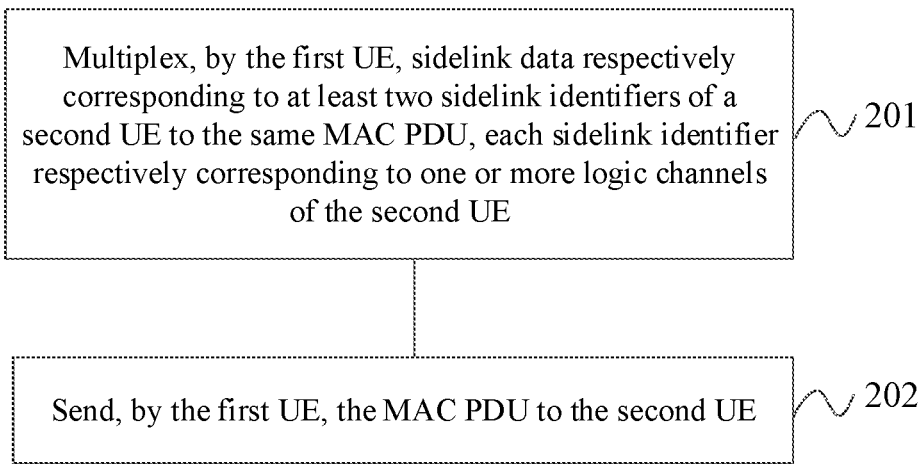
FIG. 2 is a flowchart of a method for sending sidelink data provided by one example of the present disclosure.

FIG. 2 illustrates a flowchart of a method for sending sidelink data provided by one example of the present disclosure. The method may be implemented by a first UE (such as UE1 in FIG. 1) in the V2X. The method includes:

Step 201, the first UE multiplexes sidelink data respectively corresponding to at least two sidelink identifiers of a second UE to the same MAC PDU.

In one example, the first UE is a sending end UE, and the second UE is a receiving end UE.

The UE may include various kinds of handheld devices, vehicle-mounted devices, wearable devices, computing devices or other processing devices connected to a radio modem, or various forms of UEs, mobile stations (MSs), terminal devices, and the like, which are provided with wireless communication functions. For convenience of description, the devices mentioned above is collectively referred to as UE. In this example, a UE is a device that supports sidelink, such as a vehicle, other vehicles, infrastructures, and pedestrians.

Each UE corresponds to one or more sidelink identifiers. Taking the sidelink identifier of the second UE as an example, each sidelink identifier respectively corresponds to one or more logic channels of the second UE.

The first UE may multiplex the sidelink data respectively corresponding to at least two sidelink identifiers belonging to the second UE to the same MAC PDU.

In one example, the MAC PDU includes at least two SL-SCH sub-headers; each SL-SCH sub-header respectively corresponds to the respective sidelink identifiers; each SL-SCH sub-header is configured to indicate the sidelink identifier corresponding to one or more MAC SDUs belonging to the SL-SCH sub-header.

Step 202, the first UE sends the MAC PDU to the second UE.

In one example, V2X communication between the first UE and the second UE is a unicast communication of the sidelink.

In conclusion, the first UE multiplexes the sidelink data respectively corresponding to the at least two sidelink identifiers of the second UE to the same MAC PDU and sends the MAC PDU to the second UE. Each sidelink identifier respectively corresponds to one or more logic channels of the second UE, so that in the case that the bearable data volume of the time-frequency resource is greater than the data volume of the MAC PDU, idle transmission resources in the time-frequency resource are utilized as much as possible to increase the utilization rate of resources.

Figure 3:
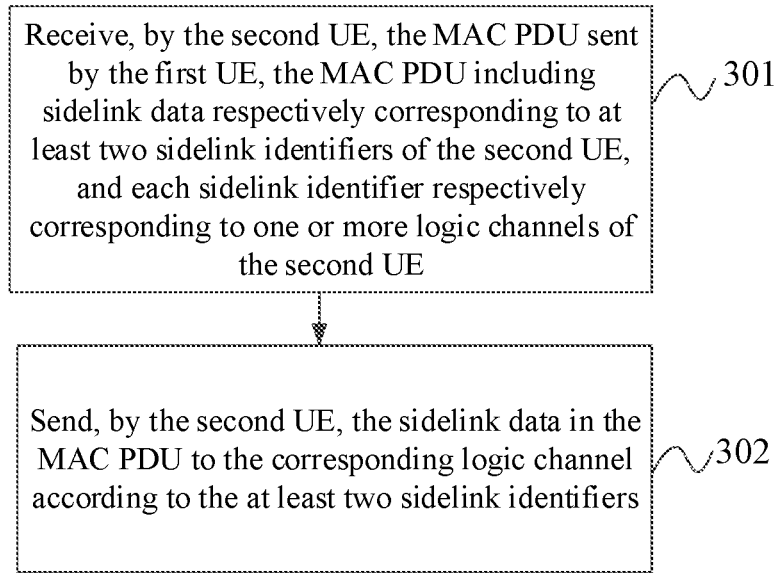
FIG. 3 is a flowchart of a method for receiving sidelink data provided by one example of the present disclosure.

FIG. 3 illustrates a flowchart of a method for receiving sidelink data provided by one example of the present disclosure. The method may be implemented by a second UE (such as UE2 in FIG. 1) in the V2X. The method includes:

Step 301, the second UE receives an MAC PDU sent by a first UE, the MAC PDU including sidelink data respectively corresponding to at least two sidelink identifiers of the second UE, and each sidelink identifier respectively corresponding to one or more logic channels of the second UE.

In one example, the MAC PDU includes at least two SL-SCH sub-headers; each SL-SCH sub-header respectively corresponds to the respective sidelink identifiers; each SL-SCH sub-header is configured to indicate the sidelink identifier corresponding to one or more MAC SDUs belonging to the SL-SCH sub-header.

In one example, the first UE is a sending end UE, and the second UE is a receiving end UE. In one example, V2X communication between the first UE and the second UE is a unicast communication of the sidelink.

Step 302, the second UE sends the sidelink data in the MAC PDU to the corresponding logic channel according to the at least two sidelink identifiers.

In conclusion, the first UE multiplexes the sidelink data respectively corresponding to the at least two sidelink identifiers of the second UE to the same MAC PDU and sends the MAC PDU to the second UE. Each sidelink identifier respectively corresponds to one or more logic channels of the second UE, so that in the case that the bearable data volume of the time-frequency resource is greater than the data volume of the MAC PDU, idle transmission resources in the time-frequency resource are utilized as much as possible to increase the utilization rate of resources.

Figure 4:
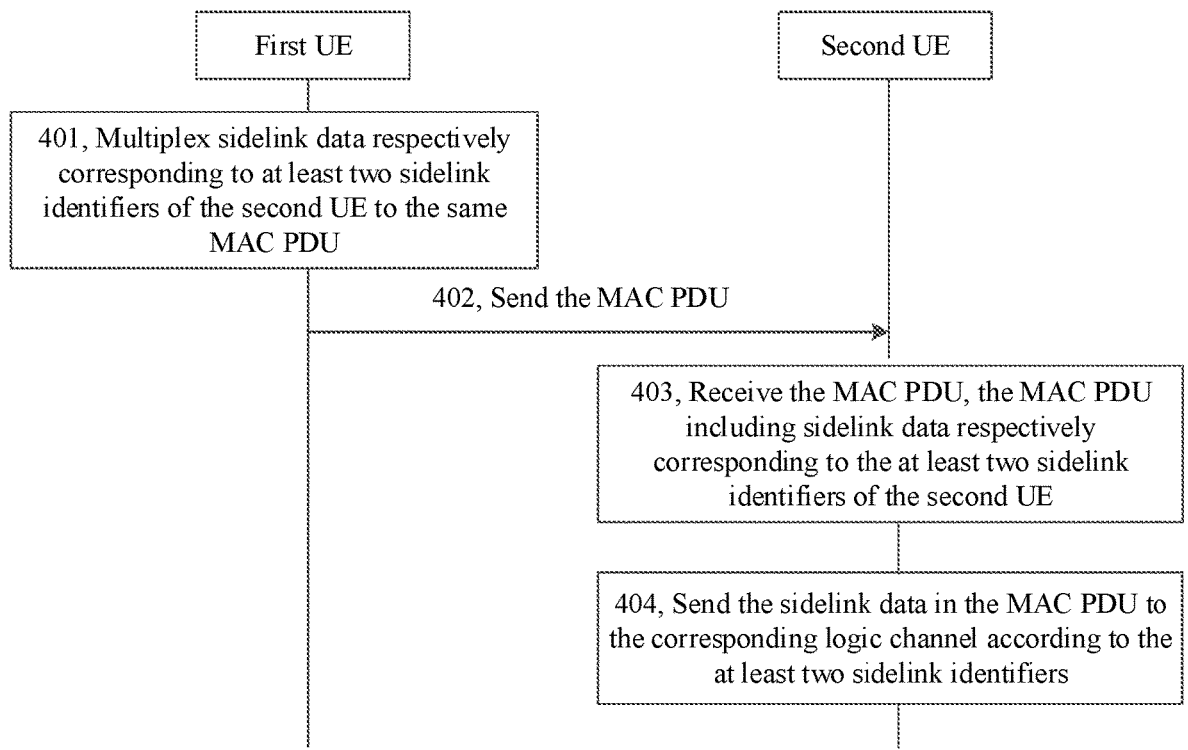
FIG. 4 is a flowchart of transmission of sidelink data provided by one example of the present disclosure.

FIG. 4 illustrates a flowchart of a method for sending sidelink data provided by one example of the present disclosure. The method may be implemented by a first UE and a second UE (such as UE1 and UE2 in FIG. 1) in the V2X. The method includes:

Step 401, the first UE multiplexes sidelink data respectively corresponding to at least two sidelink identifiers of the second UE to the same MAC PDU.

In one example, the MAC PDU includes at least two SL-SCH sub-headers; each SL-SCH sub-header respectively corresponds to the respective sidelink identifiers; each SL-SCH sub-header is configured to indicate the sidelink identifier corresponding to one or more MAC SDUs belonging to the SL-SCH sub-header.

Step 402, the first UE sends the MAC PDU to the second UE.

V2X communication between the first UE and the second UE may be a unicast communication of the sidelink.

Step 403, the second UE receives the MAC PDU, the MAC PDU including sidelink data respectively corresponding to the at least two sidelink identifiers of the second UE.

Step 404, the second UE sends the sidelink data in the MAC PDU to the corresponding logic channel according to the at least two sidelink identifiers.

Figure 5:
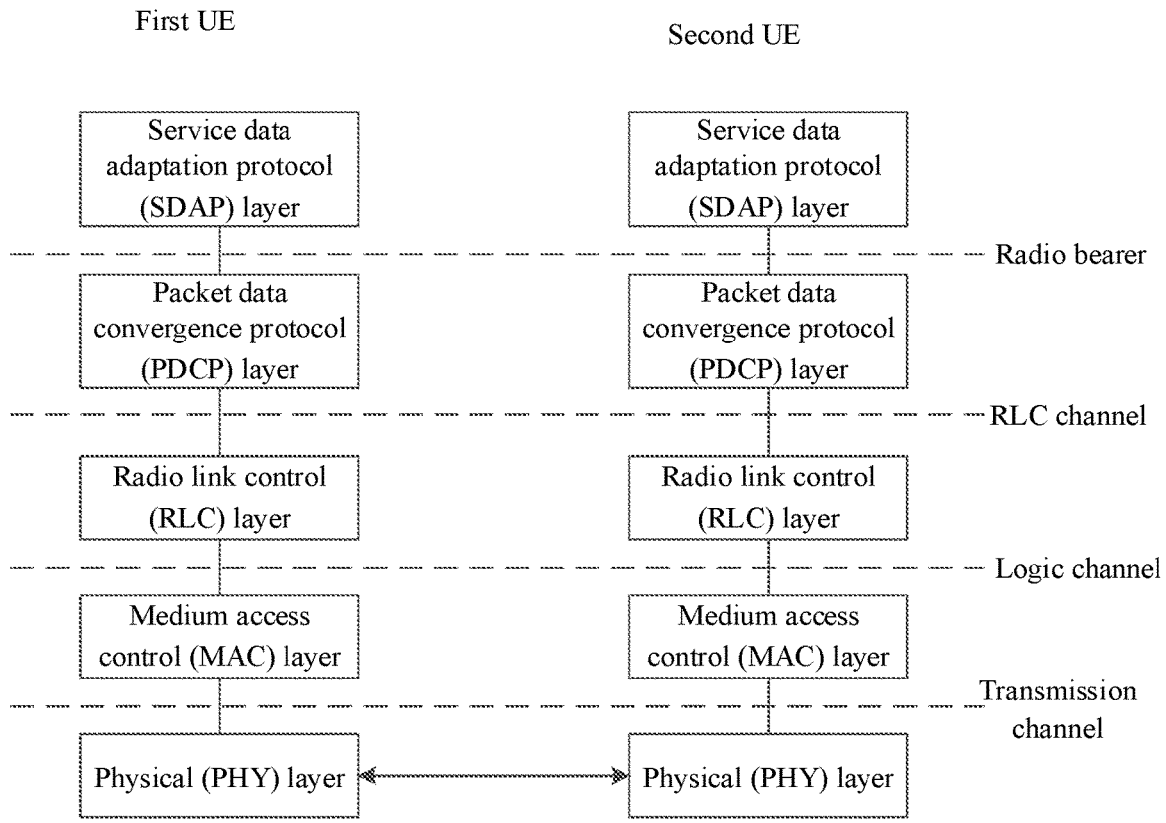
FIG. 5 is a schematic diagram of a sidelink protocol stack provided by one example of the present disclosure.

Referring to FIG. 5, FIG. 5 illustrates a schematic diagram of a sidelink protocol stack provided by one example of the present disclosure. In FIG. 5, five sublayers are included: a physical (PHY) layer, a Medium Access control (MAC)

layer, a Radio Link Control (RLC) layer, a Packet Data Convergence Protocol (PDCP) layer, and a Service Data Adaptation Protocol (SDAP) layer.

A connection point between layers is called a Service Access Point (SAP). The PHY layer provides a transmission-channel-level service for the MAC sublayer; the MAC sublayer provides a logic-channel-level service for the RLC sublayer; the PDCP sublayer provides a radio bearer-level service for the SDAP layer; and the SDAP layer provides a 5G core network Quality of Service (QoS)-level service for an upper layer. The MAC sublayer is responsible for multiplexing a plurality of logical channels to the same transmission channel.

The MAC layer of the first UE will receive to-be-sent sidelink data from a plurality of logical channels. Target identifiers of the to-be-sent sidelink data are the sidelink identifiers of other UEs. Taking other UEs including the second UE as an example, the second UE corresponds to one or more sidelink identifiers, and each sidelink identifier corresponds to one or more logical channels of the second UE. The first UE may multiplex the to-be-sent data (the to-be-sent sidelink data) of the logical channels corresponding to the at least two sidelink identifiers of the second UE to the same MAC PDU, and send the MAC PDU to the second UE.

Figure 6:
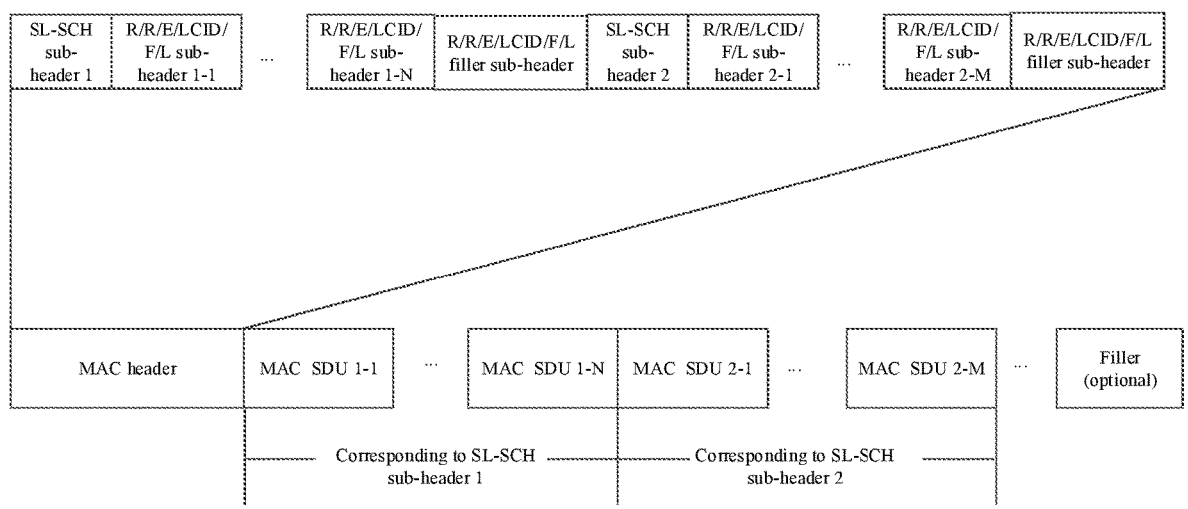
FIG. 6 is a format diagram of an MAC PDU provided by one example of the present disclosure.

Referring to FIG. 6, FIG. 6 illustrates a format diagram of an MAC PDU provided by an example of the present disclosure. The MAC PDU includes an MAC header, at least two MAC SDUs, and a filler (optional). The MAC header includes at least two SL-SCH sub-headers, and each SL-SCH sub-header corresponds to at least one R/R/E/LCID/F/L sub-header and a filler sub-header (optional). Each SL-SCH sub-header also corresponds to an MAC SDU.

For each SL-SCH sub-header, the number of R/R/E/LCID/F/L sub-headers and the number of MAC SDUs, that is, the R/R/E/LCID/F/L sub-headers and the MAC SDUs have a one-to-one correspondence relation.

Each SL-SCH sub-header carries a source identifier and a target identifier. For example, the MAC header in FIG. 6 includes two SL-SCH sub-headers. The SL-SCH sub-header 1 corresponds to the R/R/E/LCID/F/L sub-header 1-1 to the R/R/E/LCID/F/L sub-header 1-N, and also corresponds to the MAC SDU 1-1 to the MAC SDU 1-N. The number of MAC SDUs and the number of R/R/E/LCID/F/L sub-headers are the same and have a one-to-one correspondence relation. For example, the R/R/E/LCID/F/L sub-header 1-1 corresponds to the MAC SDU 1-1. The SL-SCH sub-header 2 corresponds to the R/R/E/LCID/F/L sub-header 2-1 to the R/R/E/LCID/F/L sub-header 2-N, and also corresponds to the MAC SDU 2-1 to the MAC SDU 2-N. The number of MAC SDUs and the number of R/R/E/LCID/F/L sub-headers are the same and have a one-to-one correspondence relation. For example, the R/R/E/LCID/F/L sub-header 2-1 corresponds to the MAC SDU 2-1.

In each R/R/E/LCID/F/L sub-header, LCD is configured to indicate a logical channel; L indicates a length of an MAC SDU; except for the last sub-header and the sub-header corresponding to a fixed-length control message, each sub-header has an L field, and its length is indicated by an F field; if the length of the MAC SDU is greater than 128 bytes, F is set to be equal to 1, otherwise, F is set to be equal to 0. Through the value of F, the size of the corresponding L value and the length of the MAC SDU can be known. E indicates whether there are a plurality of fields in the MAC header. If E=1, it means that there is another group of R/R/E/LCID/F/L sub-headers. If E=0, it means that there is no other group of R/R/E/LCID/F/L sub-headers. R is a reserved bit, which is set to be "0".

The number of MAC SDUs and the number of R/R/E/LCID/F/L sub-headers are the same and have a one-to-one correspondence relation. There is a correspondence relation between the filler and the filler sub-header.

In one example, the MAC PDU includes at least two SL-SCH sub-headers; each SL-SCH sub-header respectively corresponds to a sidelink identifier; and each SL-SCH sub-header is configured to indicate the sidelink identifier corresponding to one or more MAC SDUs belonging to the SL-SCH sub-header.

Figure 7:
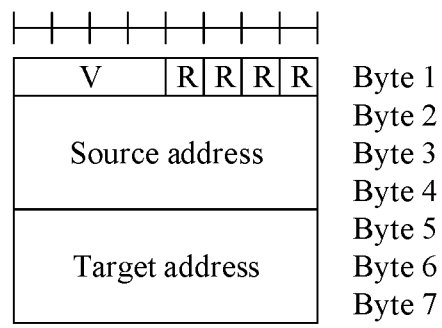
FIG. 7 is a format diagram of an SL-SCH sub-header in the MAC PDU shown in FIG. 6.

Referring to FIG. 7, FIG. 7 illustrates a format diagram of an SL-SCH sub-header in the MAC-PDU provided by one example of the present disclosure.

The SL-SCH sub-header includes seven bytes, and each byte occupies eight bits. Byte 1 includes version information V occupying four bits, and a reserved bit R occupying four bits. Byte 2 to byte 4 are source identifiers (such as the sidelink identifiers of the first UE), and byte 5 to byte 7 are target identifiers (such as the sidelink identifiers of the second UE). The version information V is configured to indicate unicast/multicast/broadcast.

The source identifier and target identifier in each SL-SCH sub-header are generated by an application layer (Layer 2) and provided to an access (AS) layer for use and correspond to the sidelink identifiers.

Figure 8:
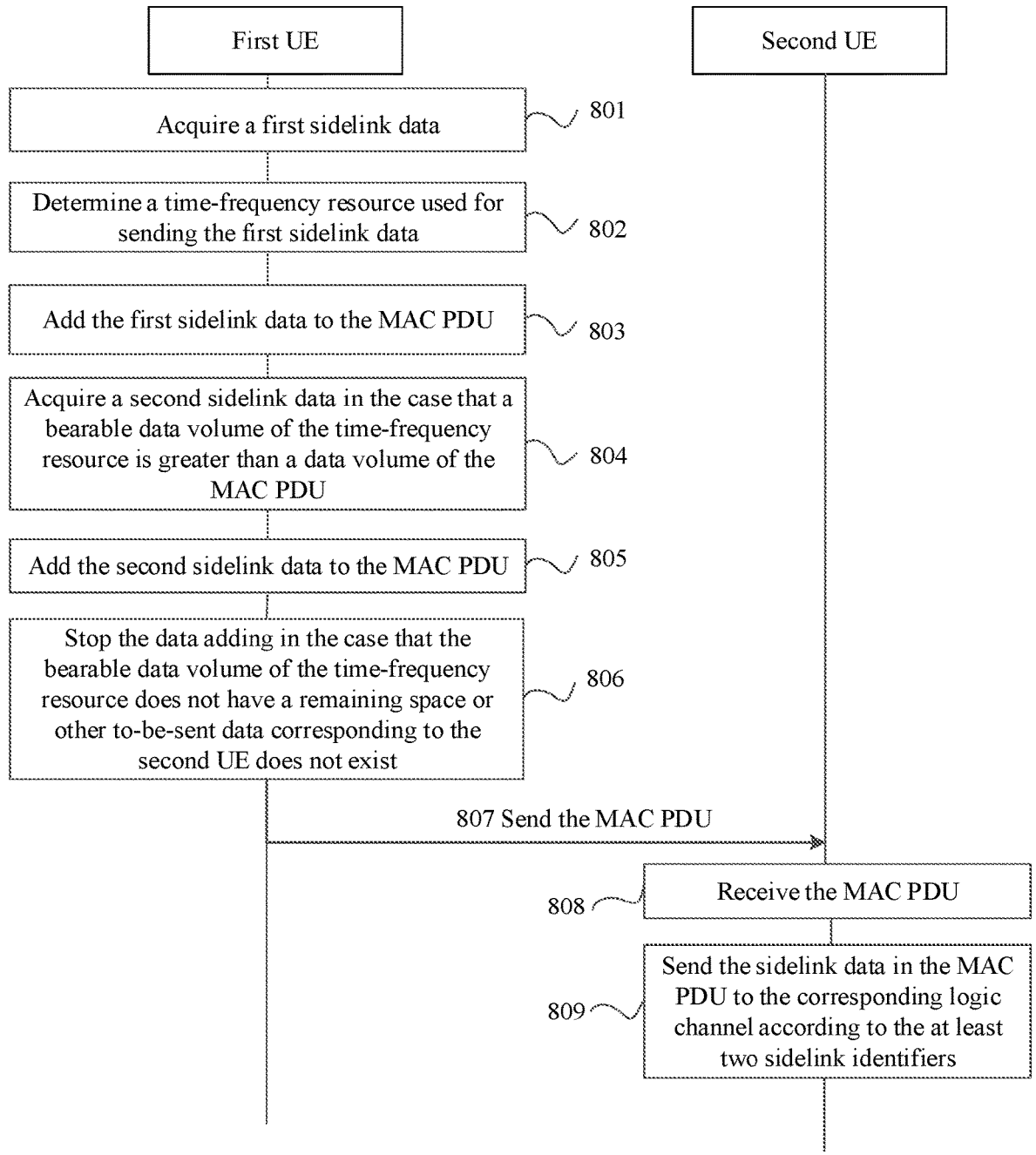
FIG. 8 is a flowchart of a method for multiplexing sidelink data provided by one example of the present disclosure.

FIG. 8 illustrates a flowchart of a method for sending sidelink data provided by an example. The method may be implemented by a first UE and a second UE (such as UE1 and UE2 in FIG. 1) in the V2X. The method includes:

Step 801: the first UE acquires a first sidelink data.

In one example, in the first UE, there are a plurality of logical channels on which to-be-sent sidelink data exist. Each logical channel corresponds to its respective sidelink identifiers, and different sidelink identifiers correspond to the same or different UEs.

In one example, the step that the first UE acquires the first sidelink data includes: a first sidelink identifier corresponding to the highest priority logical channel is acquired, the highest priority logical channel being a logical channel corresponding to the second UE; and the to-be-sent sidelink data on all the logical channels corresponding to the first sidelink identifier is acquired and is determined as the first sidelink data.

Step 802, the first UE determines a time-frequency resource used for sending the first sidelink data.

In one example, the step that the time-frequency resource used for sending the first sidelink data is determined includes: sidelink grant information sent by a base station is received, the sidelink grant information being configured to indicate the time-frequency resource that sends the first sidelink data; or, the time-frequency resource is determined from a pre-configured resource pool.

In one example, two transmission modes for sidelink are defined in 3GPP: Mode A and Mode B. Mode A: a transmission resource of a terminal is allocated by the base station through a downlink; the terminal sends data on a lateral link according to the resource allocated by the base station; the base station may allocate a resource for single transmission for the terminal or allocate a resource for semi-static transmission for the terminal. Mode B: a terminal selects, by itself, a resource from the resource pool for data transmission.

Step 803, the first sidelink data is added to the MAC PDU.

In one example, the step that the first sidelink data is added to the MAC PDU includes: a first SL-SCH sub-header is added to the MAC PDU according to the sidelink identifier of the highest priority logical channel, the first SL-SCH sub-header being configured to indicate a first group of MAC SDUs; the first group of MAC SDUs is added to the MAC PDU according to the first sidelink data.

In one example, in the case that the first sidelink data corresponds to one logical channel X, one MAC SDU and the corresponding R/R/E/LCID/F/L sub-header are added to the MAC PDU. A Logic Channel Identifier (LCD) in the R/R/E/LCID/F/L sub-header is the identifier of the logical channel X. In the case that the first sidelink data corresponds to at least n logical channels, n MAC SDUs and corresponding R/R/E/LCID/F/L sub-headers are added to the MAC PDU. The LCID in each R/R/E/LCID/F/L sub-header is the identifier of the corresponding logical channel.

Step 804, the first UE acquires a second sidelink data in the case that a bearable data volume of the time-frequency resource is greater than a data volume of the MAC PDU.

Step 805, the first UE adds the second sidelink data to the MAC PDU.

In one example, the first UE adds a second SL-SCH sub-header to the MAC PDU according to the sidelink identifier of the logical channel corresponding to the second sidelink data, and the second SL-SCH sub-header is configured to indicate a second group of MAC SDUs. The second group of MAC SDUs is added to the MAC PDU according to the second sidelink data.

In one example, in the case that the second sidelink data corresponds to one logical channel X, one MAC SDU and the corresponding R/R/E/LCID/F/L sub-header are added to the MAC PDU. An LCID in the R/R/E/LCID/F/L sub-header is the identifier of the logical channel X. In the case that the second sidelink data corresponds to at least n logical channels, n MAC SDUs and corresponding R/R/E/LCID/F/L sub-headers are added to the MAC PDU. The LCID in each R/R/E/LCID/F/L sub-header is the identifier of the corresponding logical channel.

Step 806, data adding is stopped in the case that the bearable data volume of the time-frequency resource does not have a remaining space or other to-be-sent data corresponding to the second UE does not exist.

In one example, in the case that there is a remaining space for the bearable data volume of the time-frequency resource and there is other to-be-sent data corresponding to the second UE, step 804 is re-executed to continue to add data to the MAC PDU.

In addition, the data that is continued to be added may be referred to as: third sidelink data, fourth sidelink data, fifth sidelink data, and the like.

Step 807, the first UE sends the MAC PDU to the second UE.

The first UE sends the MAC PDU to the second UE through the acquired time-frequency resource.

Step 808, the second UE sends the sidelink data in the MAC PDU to the corresponding logic channel according to the at least two sidelink identifiers.

In one example, the second UE sends, according to a sidelink identifier (target identifier) in the SL-SCH sub-header, one or more MAC SDUs belonging to the SL-SCH sub-header to the logical channel corresponding to the sidelink identifier.

In one example, in the case that there are at least two logical channels corresponding to the sidelink identifier, for one or more MAC SDUs belonging to the SL-SCH sub-header, the MAC SDU is sent, according an LCID in the R/R/E/LCID/F/L sub-header corresponding to each MAC SDU, to the logic channel corresponding to the LCD.

In conclusion, according to the method provided in this example, the first UE multiplexes the sidelink data respectively corresponding to the at least two sidelink identifiers of the second UE to the same MAC PDU and sends the MAC PDU to the second UE. Each sidelink identifier respectively corresponds to one or more logic channels of the second UE, so that in the case that the bearable data volume of the time-frequency resource is greater than the data volume of the MAC PDU, idle transmission resources in the time-frequency resource are utilized as much as possible to increase the utilization rate of resources.

In one example, Table I shows relations among UEs, sidelink identifiers, logic channels, and to-be-sent data.

TABLE I

| UE | (Target) sidelink identifier | Logic channel | To-be-sent data | Priority (the higher the numerical value, the higher the priority) |
|---|---|---|---|---|
| UE2 | SideLink identifier a | Logic channel 2-1 | 1 kb | 4 |
| UE2 | SideLink identifier b | Logic channel 2-2 | 1 kb | 2 |
| UE2 | SideLink identifier c | Logic channel 2-3 | 1 kb + 1 kb = 2 kb | 3 |
| UE2 | SideLink identifier c | Logic channel 2-4 | | 3 |
| UE3 | SideLink identifier d | Logic channel 3-1 | 1 kb | 1 |
| UE3 | SideLink identifier e | Logic channel 3-2 | 2 kb | 3 |

1. UE1 sends a SidelinkUEInformation message to the base station. The message carries target sidelink identifiers a, b, c, d, and e and indicates that a, b, and c correspond to the same UE2, and d and e correspond to the same UE3.

2. UE1 receives a Sidelink grant from the base station and may send 3 kb data.

3. UE1 firstly selects the sidelink identifier a with the highest priority 4 according to the priority of the logic channel, and puts 1 kb data (the to-be-sent data corresponding to the logic channel 2-1) into the MAC PDU according to the priority order of the logic channel.

4. If UE1 finds that Sidelink data can be continued to be sent, UE1 selects c with higher priority from among other target sidelinkUE identifiers b and c corresponding to UE2, and adds 2 kb data (the to-be-sent data corresponding to the logic channel 2-3 and the logic channel 2-4) to the MAC PDU according to the priority order of the logic channel.

5. If UE1 finds that there is no redundant space, UE1 sends the MAC PDU to the PHY layer and transmits the MAC PDU to UE2.

Figure 9:
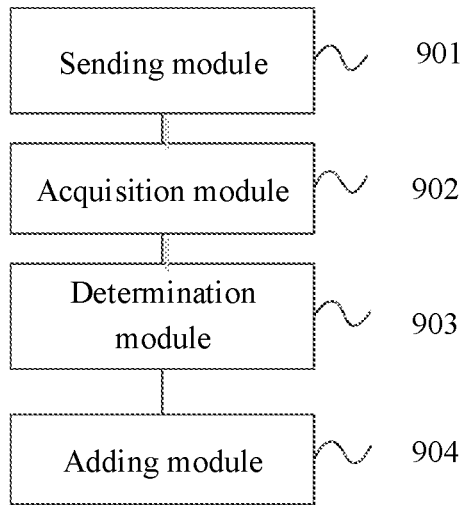
FIG. 9 is a structural schematic diagram of an apparatus for sending sidelink data provided by one example of the present disclosure.

FIG. 9 illustrates a structural schematic diagram of an apparatus for sending sidelink data provided by one example of the present disclosure. The apparatus may be implemented as all or part of a first UE by means of software, hardware, or a combination of software and hardware. The apparatus includes a sending module 901, an acquisition module 902, a determination module 903, and an adding module 904.

The sending module 901 is configured to multiplex sidelink data respectively corresponding to at least two sidelink identifiers of a second UE to the same MAC PDU, and send the MAC PDU to the second UE, each sidelink identifier respectively corresponding to one or more logic channels of the second UE.

In one example, the MAC PDU includes at least two SL-SCH sub-headers; each SL-SCH sub-header respectively corresponds to the respective sidelink identifiers; each SL-SCH sub-header is configured to indicate the sidelink identifier corresponding to one or more MAC SDUs belonging to the SL-SCH sub-header.

In one example, the acquisition module 902 is configured to acquire a first sidelink data, the first sidelink data being to-be-sent data corresponding to a first sidelink identifier of the highest priority logic channel, and the highest priority logic channel being a logic channel corresponding to the second UE; the determination module 903 is configured to determine a time-frequency resource used for sending the first sidelink data; the adding module 904 is configured to add the first sidelink data to the MAC PDU; the acquisition module 902 is configured to acquire a second sidelink data in the case that a bearable data volume of the time-frequency resource is greater than a data volume of the MAC PDU, the second sidelink data being to-be-sent data corresponding to a second sidelink identifier of the highest priority logic channel among other logic channels of the second UE; the adding module 904 is configured to add the second sidelink data to the MAC PDU; the sending module 901 is configured to send the MAC PDU to the second UE using the time-frequency resource in the case that the bearable data volume of the time-frequency resource does not have a remaining space or other to-be-sent data corresponding to the second UE does not exist.

In one example, the acquisition module 902 is configured to acquire the first sidelink identifier corresponding to the highest priority logical channel, the highest priority logical channel being a logical channel corresponding to the second UE; and the determination module 903 is configured to determine the to-be-sent sidelink data on all the logical channels corresponding to the first sidelink identifier as the first sidelink data.

In one example, the acquisition module 902 is configured to acquire a second sidelink identifier corresponding to the highest priority logical channel among other logic channels corresponding to the second UE in the case that the bearable data volume of the time-frequency resource is greater than a data volume of the first sidelink data; and the determination module 903 is configured to determine the to-be-sent sidelink data on all the logical channels corresponding to the second sidelink identifier as the second sidelink data.

In one example, the adding module 904 is configured to: add a first SL-SCH sub-header to the MAC PDU according to the sidelink identifier of the highest priority logical channel, the first SL-SCH sub-header being configured to indicate a first group of MAC SDUs; and add the first group of MAC SDUs to the MAC PDU according to the first sidelink data.

In one example, the adding module 904 is configured to: add a second SL-SCH sub-header to the MAC PDU according to the sidelink identifier of the logical channel corresponding to the second sidelink data, the second SL-SCH sub-header being configured to indicate a second group of MAC SDUs; and add the second group of MAC SDUs to the MAC PDU according to the second sidelink data.

In one example, the determination module 903 is configured to receive sidelink grant information sent by an access network device (such as a base station), the sidelink grant information being configured to indicate the time-frequency resource; or, the determination module 903 is configured to determine the time-frequency resource from a pre-configured resource pool.

Figure 10:
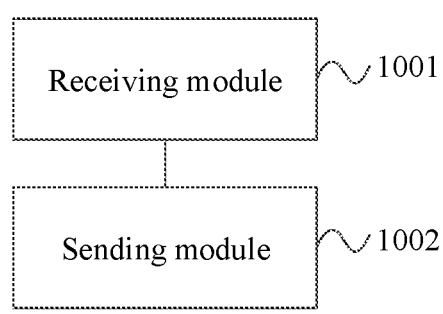
FIG. 10 is a structural schematic diagram of an apparatus for receiving sidelink data provided by one example of the present disclosure.

FIG. 10 illustrates a structural schematic diagram of an apparatus for receiving sidelink data provided by one example of the present disclosure. The apparatus may be implemented as all or part of a second UE by means of software, hardware, or a combination of software and hardware. The apparatus includes a receiving module 1001 and a sending module 1002.

The receiving module 1001 is configured to receive an MAC PDU sent by a first UE, the MAC PDU including sidelink data respectively corresponding to at least two sidelink identifiers of the second UE, and each sidelink identifier respectively corresponding to one or more logic channels of the second UE.

The MAC PDU includes at least two SL-SCH sub-headers; each SL-SCH sub-header respectively corresponds to a sidelink identifier; and each SL-SCH sub-header is configured to indicate the sidelink identifier corresponding to one or more MAC SDUs belonging to the SL-SCH sub-header.

The sending module 1002 is configured to send the sidelink data in the MAC PDU to the corresponding logic channel according to the at least two sidelink identifiers.

In one example, the MAC PDU includes at least two SL-SCH sub-headers; each SL-SCH sub-headers respectively corresponds to the respective sidelink identifiers; each SL-SCH sub-header is configured to indicate the sidelink identifier corresponding to one or more MAC SDUs belonging to the SL-SCH sub-header.

In one example, the sending module 1002 is configured to send one or more MAC SDUs belonging to the SL-SCH sub-header to the logic channel corresponding to the sidelink identifier according to the sidelink identifier in the SL-SCH sub-header.

Figure 11:
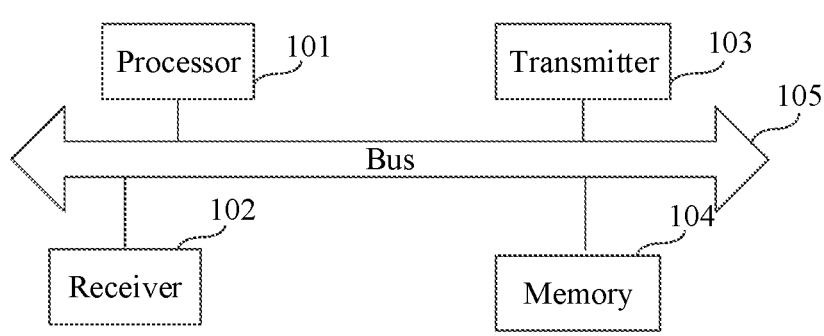
FIG. 11 is a structural schematic diagram of a terminal for sidelink provided by one example of the present disclosure.

FIG. 11 illustrates a structural schematic diagram of a terminal (or a V2X device) provided by an example of the present disclosure. The terminal includes a processor 101, a receiver 102, a transmitter 103, a memory 104, and a bus 105.

The processor 101 includes one or more processing cores, and the processor 101 executes various functional applications and information processing by running software programs and modules.

The receiver 102 and the transmitter 103 may be implemented as a communication component, and the communication component may be a communication chip.

The memory 104 is connected to the processor 101 through the bus 105.

The memory 104 may be configured to store at least one instruction, and the processor 101 is configured to execute the at least one instruction to implement various steps in the foregoing examples of the method.

In addition, the memory 104 may be implemented by any type of volatile or non-volatile storage device or a combination thereof. The volatile or non-volatile storage device includes, but is not limited to: a magnetic disk or an optical disk, an electrically erasable and programmable read-only memory (EEPROM), an erasable programmable read-only memory (EPROM), a static random access memory (SRAM), a read-only memory (ROM), a magnetic memory, a flash memory, and a programmable read-only memory (PROM).

In an example, a computer-readable storage medium is further provided. The computer-readable storage medium stores at least one instruction, at least one program, a code set, or an instruction set; the at least one instruction, the at least one program, the code set, or the instruction set is loaded and executed by a processor to implement the methods for sending/receiving the sidelink data provided by all the above method examples and executed by a terminal.

The technical solutions provided by the examples of the present disclosure at least include the following beneficial effects.

The first UE multiplexes the sidelink data respectively corresponding to the at least two sidelink identifiers of the second UE to the same MAC PDU and sends the MAC PDU to the second UE. Each sidelink identifier respectively corresponds to one or more logic channels of the second UE, so that in the case that the bearable data volume of the time-frequency resource is greater than the data volume of the MAC PDU, idle transmission resources in the time-frequency resource are utilized as much as possible to increase the utilization rate of resources.

Those of ordinary skill in the art can understand that all or part of the steps in the foregoing examples can be implemented by hardware, or by instructing, by a program, relevant hardware to be completed. The program can be stored in a computer-readable storage medium. The storage medium mentioned above can be an ROM, a magnetic disk or an optical disk.

The above descriptions are only examples of the present disclosure and are not intended to limit the present disclosure. Any modification, equivalent replacement, improvement, etc. made within the spirit and principle of the present disclosure shall all fall within the protection scope of the present disclosure.

What is claimed is:

1. A method for sending sidelink data, comprising:
   multiplexing, by a first user equipment (UE) in a Vehicle to Everything, sidelink data respectively corresponding to at least two sidelink identifiers of a second UE to a same Medium Access Control Protocol Data Unit (MAC PDU), and sending, by the first UE, the MAC PDU to the second UE,
   wherein each sidelink identifier respectively corresponds to one or more logic channels of the second UE;
   wherein multiplexing the sidelink data respectively corresponding to the at least two sidelink identifiers of the second UE to the same MAC PDU and sending the MAC PDU to the second UE comprises:
   acquiring a first sidelink data, wherein the first sidelink data is to-be-sent data corresponding to a first sidelink identifier of a first highest priority logic channel, and the first highest priority logic channel is a logic channel corresponding to the second UE;
   determining a time-frequency resource used for sending the first sidelink data;
   adding the first sidelink data to the MAC PDU;
   acquiring a second sidelink data in response to determining that a bearable data volume of the time-frequency resource is greater than a data volume of the MAC PDU, wherein the second sidelink data is to-be-sent data corresponding to a second sidelink identifier of a second highest priority logic channel among other logic channels of the second UE;
   adding the second sidelink data to the MAC PDU; and
   sending the MAC PDU to the second UE using the time-frequency resource.

2. The method according to claim 1, wherein the MAC PDU comprises at least two SideLink Share Channel (SL-SCH) sub-headers; each SL-SCH sub-header respectively corresponds to the sidelink identifier; each SL-SCH sub-header is configured to indicate the sidelink identifier corresponding to one or more Medium Access Service Protocol Data Units (MAC SDUs) belonging to the SL-SCH sub-header.

3. The method according to claim 1, wherein sending the MAC PDU to the second UE using the time-frequency resource comprises:
   sending the MAC PDU to the second UE using the time-frequency resource in response to determining that the bearable data volume of the time-frequency resource does not have a remaining space or other to-be-sent data corresponding to the second UE does not exist.

4. The method according to claim 1, wherein acquiring the first sidelink data comprises:
   acquiring a first sidelink identifier corresponding to the first highest priority logic channel, wherein the first highest priority logic channel is a logic channel corresponding to the second UE; and
   acquiring and determining to-be-sent sidelink data on all the logic channels corresponding to the first sidelink identifier as the first sidelink data.

5. The method according to claim 1, wherein acquiring to-be-sent second sidelink data on other logic channels of the second UE in response to determining that the bearable data volume of the time-frequency resource is greater than the data volume of the MAC PDU comprises:
   acquiring a second sidelink identifier corresponding to the second highest priority logical channel among other logic channels of the second UE in response to determining that the bearable data volume of the time-frequency resource is greater than a data volume of the first sidelink data; and
   acquiring and determining to-be-sent sidelink data on all the logic channels corresponding to the second sidelink identifier as the second sidelink data.

6. The method according to claim 1, wherein adding the first sidelink data to the MAC PDU comprises:
   adding a first SideLink Share Channel (SL-SCH) sub-header to the MAC PDU according to a sidelink identifier of the first highest priority logic channel, wherein the first SL-SCH sub-header is configured to indicate a first group of MAC SDUs; and
   adding the first group of MAC SDUs to the MAC PDU according to the first sidelink data.

7. The method according to claim 1, wherein adding the second sidelink data to the MAC PDU comprises:
   adding a second SideLink Share Channel (SL-SCH) sub-header to the MAC PDU according to the sidelink identifier of the logical channel corresponding to the second sidelink data, wherein the second SL-SCH sub-header is configured to indicate a second group of MAC SDUs; and
   adding the second group of MAC SDUs to the MAC PDU according to the second sidelink data.

8. The method according to claim 1, wherein determining the time-frequency resource used for sending the first sidelink data comprises:
   receiving a sidelink grant information sent by an access network device, wherein the sidelink grant information is configured to indicate the time-frequency resource; or,
   determining the time-frequency resource from a pre-configured resource pool.

9. A method for receiving sidelink data, comprising:
   receiving, by a second user equipment (UE) in a Vehicle to Everything, a Medium Access Control Protocol Data Unit (MAC PDU) sent by a first UE, wherein the MAC PDU comprises sidelink data respectively corresponding to at least two sidelink identifiers of the second UE, and each sidelink identifier respectively corresponds to one or more logic channels of the second UE; and sending, by the second UE, the sidelink data in the MAC PDU to the corresponding logic channel according to the at least two sidelink identifiers;

wherein the sidelink data respectively corresponding to the at least two sidelink identifiers of the second UE is multiplexed to the same MAC PDU by the following manner:

acquiring a first sidelink data, wherein the first sidelink data is to-be-sent data corresponding to a first sidelink identifier of a first highest priority logic channel, and the first highest priority logic channel is a logic channel corresponding to the second UE;

determining a time-frequency resource used for sending the first sidelink data;

adding the first sidelink data to the MAC PDU;

acquiring a second sidelink data in response to determining that a bearable data volume of the time-frequency resource is greater than a data volume of the MAC PDU wherein the second sidelink data is to-be-sent data corresponding to a second sidelink identifier of a second highest priority logic channel among other logic channels of the second UE;

adding the second sidelink data to the MAC PDU;

wherein the MAC PDU is sent to the second UE by the following manner:

the MAC PDU is sent to the second UE using the time-frequency resource.

10. The method according to claim 9, wherein the MAC PDU comprises at least two Side Link Share Channel (SL-SCH) sub-headers; each SL-SCH sub-header respectively corresponds to the respective sidelink identifiers; each SL-SCH sub-header is configured to indicate the sidelink identifier corresponding to one or more Medium Access Service Protocol Data Units (MAC SDUs) belonging to the SL-SCH sub-header.

11. A terminal, comprising:
a processor;
a transceiver connected with the processor; and
a memory configured to store an executable instruction executed by the processor,
wherein the processor is configured to load and execute the executable instruction to multiplex sidelink data respectively corresponding to at least two sidelink identifiers of a second UE to a same Medium Access Control Protocol Data Unit (MAC PDU), and to send the MAC PDU to the second UE,
wherein each sidelink identifier respectively corresponds to one or more logic channels of the second UE;
wherein multiplexing the sidelink data respectively corresponding to the at least two sidelink identifiers of the second UE to the same MAC PDU and sending the MAC PDU to the second UE comprises:

acquiring a first sidelink data, wherein the first sidelink data is to-be-sent data corresponding to a first sidelink identifier of a first highest priority logic channel, and the first highest priority logic channel is a logic channel corresponding to the second UE;

determining a time-frequency resource used for sending the first sidelink data;

adding the first sidelink data to the MAC PDU;

acquiring a second sidelink data in response to determining that a bearable data volume of the time-frequency resource is greater than a data volume of the MAC PDU, wherein the second sidelink data is to-be-sent data corresponding to a second sidelink identifier of a second highest priority logic channel among other logic channels of the second UE;

adding the second sidelink data to the MAC PDU; and sending the MAC PDU to the second UE using the time-frequency resource.

12. A non-transitory computer-readable storage medium, wherein the readable storage medium stores an executable instruction, wherein the executable instruction is loaded and executed by a processor to implement the method for sending sidelink data according to claim 1.

13. The terminal according to claim 11, wherein the MAC PDU comprises at least two SideLink Share Channel (SL-SCH) sub-headers; each SL-SCH sub-header respectively corresponds to the sidelink identifier; each SL-SCH sub-header is configured to indicate the sidelink identifier corresponding to one or more Medium Access Service Protocol Data Units (MAC SDUs) belonging to the SL-SCH sub-header.

14. The terminal according to claim 11, wherein the processor is further configured to:
send the MAC PDU to the second UE using the time-frequency resource in response to determining that the bearable data volume of the time-frequency resource does not have a remaining space or other to-be-sent data corresponding to the second UE does not exist.

15. The terminal according to claim 11, wherein the processor is configured to:
acquire a first sidelink identifier corresponding to the first highest priority logic channel, wherein the first highest priority logic channel is a logic channel corresponding to the second UE; and
acquire and determine to-be-sent sidelink data on all the logic channels corresponding to the first sidelink identifier as the first sidelink data.

16. The terminal according to claim 11, wherein the processor is configured to:
acquire a second sidelink identifier corresponding to the second highest priority logical channel among other logic channels of the second UE in response to determining that the bearable data volume of the time-frequency resource is greater than a data volume of the first sidelink data; and
acquire and determine to-be-sent sidelink data on all the logic channels corresponding to the second sidelink identifier as the second sidelink data.

17. The terminal according to claim 11, wherein the processor is configured to:
add a first SideLink Share Channel (SL-SCH) sub-header to the MAC PDU according to a sidelink identifier of the first highest priority logic channel, wherein the first SL-SCH sub-header is configured to indicate a first group of MAC SDUs; and
add the first group of MAC SDUs to the MAC PDU according to the first sidelink data.

18. The terminal according to claim 11, wherein the processor is configured to:
add a second SideLink Share Channel (SL-SCH) sub-header to the MAC PDU according to the sidelink identifier of the logical channel corresponding to the second sidelink data, wherein the second SL-SCH sub-header is configured to indicate a second group of MAC SDUs; and
add the second group of MAC SDUs to the MAC PDU according to the second sidelink data.

19. A terminal, comprising:
a processor;
a transceiver connected with the processor; and
a memory configured to store an executable instruction executed by the processor, wherein the processor is configured to load and execute the executable instruction to implement the method for receiving sidelink data according to claim 9.

20. A non-transitory computer-readable storage medium, wherein the readable storage medium stores an executable instruction, wherein the executable instruction is loaded and executed by a processor to implement the method for receiving sidelink data according to claim 9.

* * * * *